United States Patent

[11] 3,613,756

| [72] | Inventors | Roy C. Snyder, Jr;<br>Ralph M. Di Tore, both of San Jose, Calif. |
|---|---|---|
| [21] | Appl. No. | 758,257 |
| [22] | Filed | Sept. 9, 1968 |
| [45] | Patented | Oct. 19, 1971 |
| [73] | Assignee | Egg Express, Inc.<br>Mountain View, Calif. |

[54] EGG-SHELLING APPARATUS AND METHOD
15 Claims, 9 Drawing Figs.

[52] U.S. Cl.................................................. 146/221,
146/2 E
[51] Int. Cl.................................................. A47j 19/28
[50] Field of Search.................................. 146/2, 2.5,
221

[56] References Cited
UNITED STATES PATENTS
2,424,425  7/1947  Yates ........................... 146/2
2,575,608  11/1951  Williams, Sr. ................. 146/2

Primary Examiner—Willie G. Abercrombie
Attorney—Flehr, Hohbach, Test, Albritton & Herbert ABSTRACT: Apparatus and method for separating the bodies of hard-cooked eggs from their shells. Fluid under pressure is applied against the punctured end of an egg positioned in a restricted passageway having an internal shoulder which precludes passage of an egg in its shell therepast. Fluid introduced into the passageway enters the shell through its punctured end and forces the egg body from the shell and through the restricted end of the passageway. The restricted shoulder precludes movement of the major portion of the shell with the egg body. The membrane which normally surrounds the egg body is separated from the body with the separated shell portion. The invention is usable for shelling single eggs or a plurality thereof simultaneously.

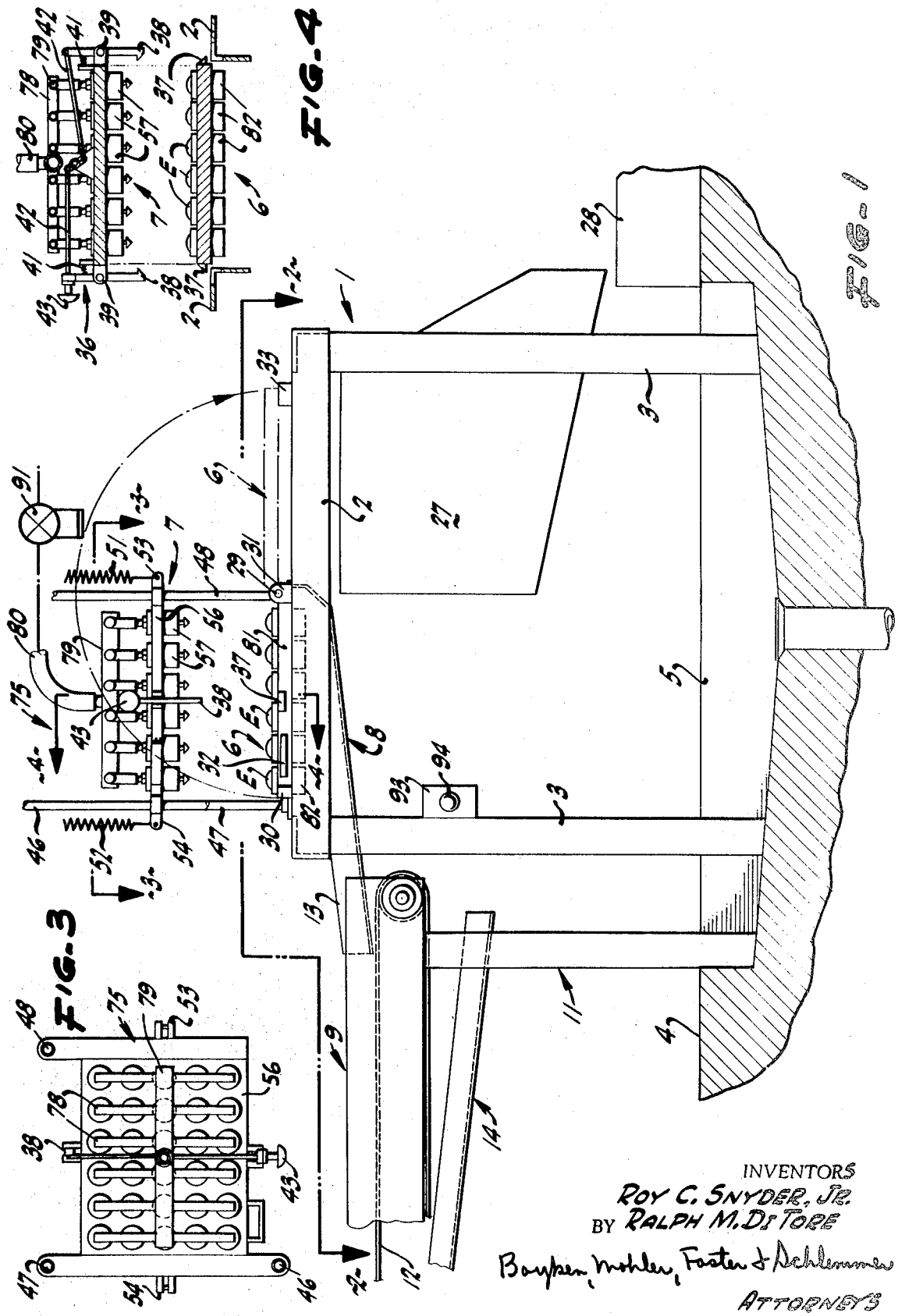

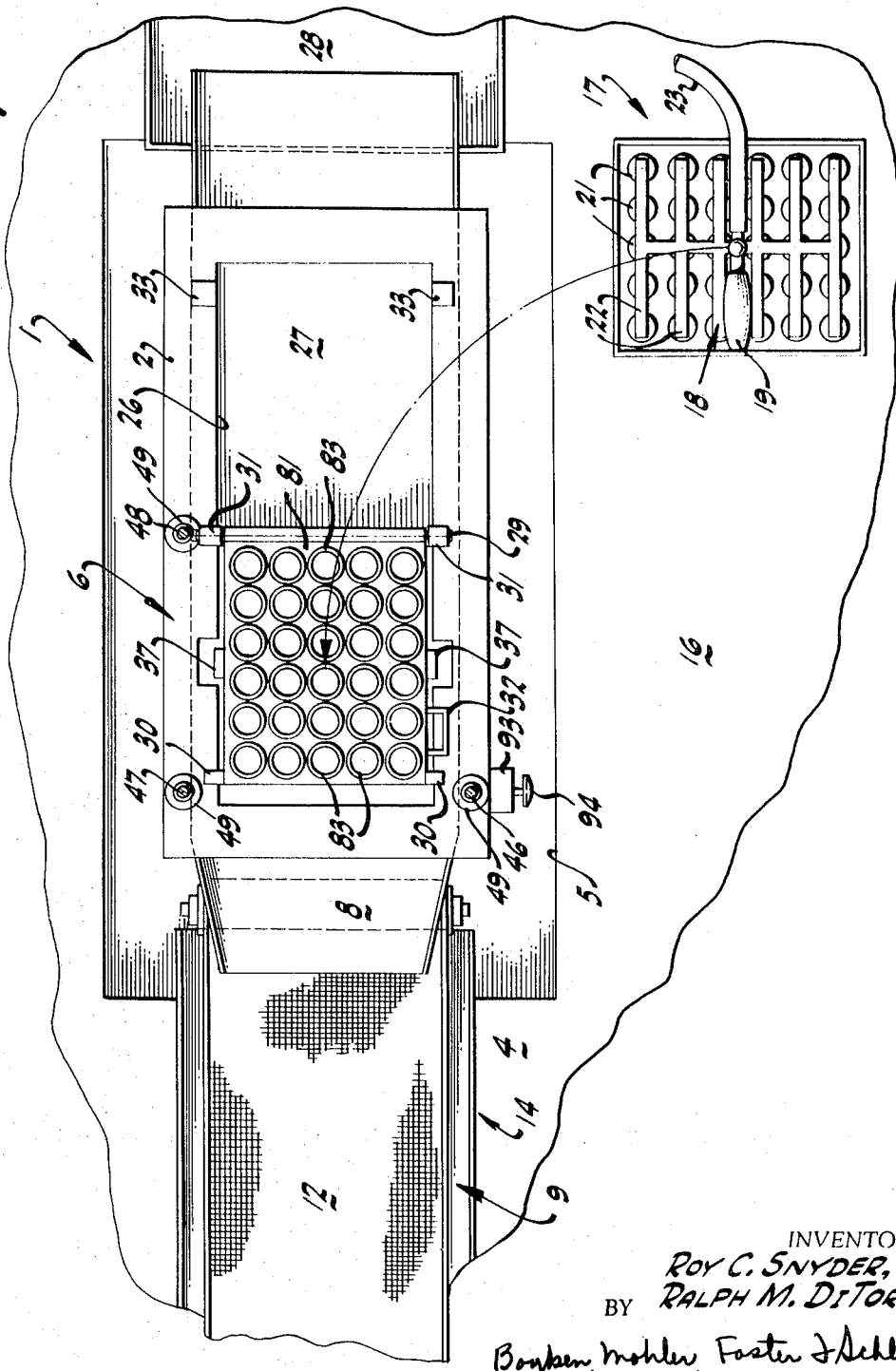

INVENTORS
ROY C. SNYDER, JR.
RALPH M. DiTORE
BY
Boykin, Mohler, Foster & Schlemmer
ATTORNEYS

EGG-SHELLING APPARATUS AND METHOD

BACKGROUND OF THE INVENTION

1. Field of the Invention

This invention relates to the commercial treatment of hard cooked eggs, such as poultry eggs, to separate the shells from the bodies of the eggs in a rapid and economical, as well as sanitary, operation. To that end, an apparatus and method are employed which utilize fluid pressure to effect rapid removal of an egg body from substantially its entire surrounding shell and protective membrane. Hydraulic fluid, preferably water, is advantageously employed as the shell separating medium.

2. Description of the Prior Art

So far as is known, commercial separation of egg shells from hard-cooked egg bodies heretofore has been effected in manual operations in which eggs are individually handled by workers to separate the shells from the bodies thereof. Such manual shelling procedures are time consuming, costly and, occasionally, unsanitary. So far as is known, mechanized shelling of hard-cooked eggs rapidly and in large quantities has been unknown heretofore.

SUMMARY OF THE INVENTION

This invention relates generally to a commercial method and apparatus for separating the bodies of hard-cooked eggs, intact and undamaged, from their shells. More particularly, this invention relates to a fluid pressure actuated egg-shelling apparatus, and its method of use. Still more particularly, this invention relates to an apparatus and method for separating simultaneously the bodies of a group of hard-cooked eggs from the tough membranes and shells which surround such bodies in a simple and rapid procedure.

The present invention solves a problem long encountered in the food processing industry, namely the problem of separating shells and membranes from the bodies of hard-cooked eggs. There is a substantial market for shelled, hard-cooked eggs in the hotel and restaurant trade. However, heretofore, egg shelling has been effected manually on a one-at-a-time basis by workers who handled individual eggs to remove the shells therefrom. Even the most skilled worker finds such a manual shelling procedure time consuming and, accordingly, manual egg shelling is an expensive procedure at today's labor costs. The apparatus of the present invention is designed for use by hotels or like businesses which have large quantity egg requirements, or by a food processor who supplies the requirements of such large quantity egg users.

With this invention, egg shelling is effected by utilizing a fluid pressure system, desirably of the hydraulic type, which preferably employs readily available tap water as the pressure medium. In the preferred embodiment disclosed herein, the subject apparatus is designed to handle thirty eggs simultaneously, which is the number of eggs commonly handled in the egg-supplying industry. Thus, by adapting the subject apparatus to handle batch quantities of eggs in the same numbers in which such eggs are obtained from the supplier, a simplified and inexpensive procedure is insured which eliminates intermediate repackaging or handling.

In that regard, eggs from the supplier are commonly transported in heat and fluid resistant plastic trays in quantities of 30 as noted. It is an important related feature of this invention that eggs may be retained in their transportation trays during cooking thereof, prior to the shelling procedure disclosed herein, thereby eliminating all intermediate handling of individual eggs received from the supplier.

The present invention performs its intended function on each individual egg by use of a simple housing having an egg-receiving passageway extending therethrough. One end of such passageway is restricted by an internal reduced-dimension shoulder which precludes passage of an egg within its shell therethrough. However, upon the application of fluid under pressure against the upper end of the egg, the shell of which has previously been punctured at such end, the fluid pressure severs the shell at its lower end and forces the egg body through the restricted opening defined by the passageway shoulder.

The major large upper portion of the shell, and the major portion of the tough membrane which surrounds the egg body, are held back by the shoulder. The resilient nature of the egg body permits it to distort temporarily, without damage, during its passage past the shoulder. In many cases, any small lower portion of a shell and membrane which pass through the reduced passageway with an egg body do not remain adhered to the egg body so that no subsequent hand cleaning of the egg body is required. However, in those limited situations in which a minor portion of the shell or membrane may remain adhered to an egg body, a simple and rapid removal operation may be manually effected during inspection of the egg body for its intended use.

A conveyor means preferably is provided in conjunction with the subject apparatus for transporting shelled egg bodies from the apparatus to an inspection station. Also, the apparatus of this invention preferably is provided with means for simplifying removal of any shell portions and attached membranes from the individual shelling passageways to prepare the passageways to receive other eggs to be shelled therein.

From the foregoing, it should be understood that objects of this invention include: the provision of an apparatus for separating simultaneously a plurality of egg bodies from their shells in a rapid procedure which requires little if any subsequent manual handling for effecting complete shell removal; the provision of an apparatus which includes a housing having a plurality of passageways therethrough in which a plurality of eggs may be positioned for simultaneous shelling; the provision of an apparatus and method for applying fluid pressure to the punctured end of an egg in which such fluid pressure is utilized to force the egg body through a restricted opening which will not accommodate an egg within a shell but which will allow the resilient shelled egg body to pass without damage; the provision of a hydraulic apparatus and procedure for separating simultaneously a quantity of egg bodies from their shells and the surrounding protective membranes; the provision in an egg-shelling apparatus of fluid pressure applying means for puncturing an end of an egg shell and for introducing fluid under pressure against the body of the egg inside such punctured shell; and the provision of an egg handling and shelling procedure in which a sequence of batches of eggs may be cooked and shelled with minimum handling.

These and other objects of this invention will become apparent from a study of the following detailed disclosure in which reference is directed to the attached drawings.

DESCRIPTION OF THE DRAWINGS

FIG. 1 is a side elevational view, partly schematic in nature, of the subject apparatus.

FIG. 2 is a partial plan view of the subject apparatus taken in the plane of line 2—2 of FIG. 1. Means for transferring a quantity of eggs from a supply thereof into the apparatus is illustrated also.

FIG. 3 is a plan view, partly in section, of the hydraulic distribution system of the apparatus taken in the plane of line 3—3 of FIG. 1.

FIG. 4 is a vertical sectional view taken in the plane of line 4—4 of FIG. 1, illustrating means for latching the hydraulic head and egg-receiving housing of the apparatus together during an egg-shelling operation.

DESCRIPTION OF THE PREFERRED EMBODIMENT

Figure 5:
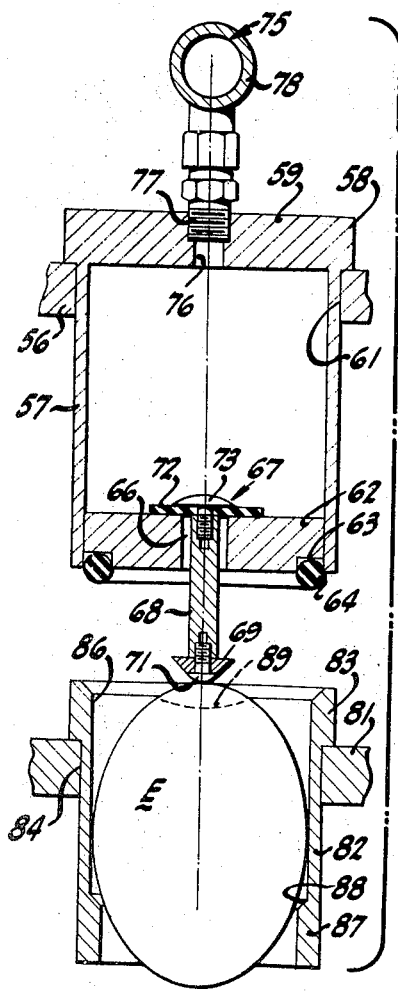
FIG. 5 is a vertical sectional view through cooperable portions of the hydraulic head and egg-receiving housing showing an egg operatively positioned in a passageway in the latter.

Reference is first directed to FIGS. 1 and 2 for a general description of the illustrated apparatus and the egg-shelling procedure performed thereby. In the illustrated embodiment, such apparatus includes a framework, generally designated 1, comprising a work table 2 supported by a plurality of supporting legs 3 above the floor 4 in the building in which the apparatus is positioned. Formed in such floor is a drain sump 5 for collecting and carrying away liquid used in the subject procedure.

Respectively mounted upon and vertically movable above the work table 2 are the two cooperable major components of the apparatus which cooperate to effect egg shelling. Such components comprise an egg-receiving housing, generally designated 6, supported on the table 2, and a vertically movable hydraulic head 7, generally designated 7, positioned above the table. Fluid introduced into and through head 7 is brought into contact with eggs E positioned in housing 6. In FIG. 1 the eggs E are shown projecting slightly above the housing for purposes of illustration only. In actual practice, however, it is preferred that the housing be designed to accommodate the eggs therein so that the upper ends of the eggs do not project above the upper limits of the housing.

When head 7 is lowered to its operative position in which it overlies and contacts the housing, fluid under pressure, which preferably is hydraulic in nature and desirably is normal temperature and pressure water direct from the tap, is applied to the upper ends of the eggs positioned in the housing. Such water separates the bodies of the eggs from the major portions of their shells and such bodies pass through the housing and drop into an inclined chute 8 from which they roll, under the effects of gravity, onto a continuous conveyor designated 9, preferably provided in conjunction with the shelling apparatus. Conveyor 9 is supported by a suitable upright framework, generally designated 11, as seen in FIG. 1.

Preferably, conveyor 9 is defined by a continuous wire mesh or other fluid pervious belt rotated beneath the discharge end 13 of the chute 8 in known fashion. Because substantial amounts of water will pass with the shelled eggs from the discharge chute 8 onto the conveyor belt, a catching trough 14 is provided beneath the belt and supported by the conveyor framework to catch and transfer fluid into the sump 5.

A workman's station, generally designated 16 in FIG. 2, is located adjacent the table 2 and close to a source of supply of previously cooked eggs to be shelled by the subject apparatus. Such source of supply is generally designated 17 in FIG. 2 and may take various forms, such as an infeed conveyor (not shown) on which successive groups of eggs in plastic trays may be carried in sequence to the station 16. Alternatively, crates of eggs having stacks of individual filled trays may be positioned at such station in any known fashion. In any event, known means, in the form of a standard vacuum egg transfer device, generally designated 18 is provided for use of the workmen at such station to transfer quantities of eggs into the shelling apparatus, Various suitable vacuum transfer devices are known in the egg-handling industry. The exemplary transfer means shown in FIG. 2 comprises a manually graspable handle 19 and a series of vacuum cups 21, each of which depends from a vacuum manifold, designated 22, with which the handle is connected. A source of vacuum, indicated by hose 23, is introduced through handle 19 into the manifold. Illustrative of the types of vacuum transfer devices commonly used in the egg-handling industry are the devices shown in the following patents: Morris, U.S. Pat. No. 2,840,415; Hirt, U.S. Pat. No. 3,061,352; and Hirt, U.S. Pat. No. 3,230,001.

It should be understood that with such a vacuum transfer device, a workman may pick up a quantity of eggs simultaneously and transfer the same into the shelling apparatus disclosed herein. In that regard, as noted previously, eggs commonly are processed and transported in trays in groups of 30. Therefore, such a transfer device desirably is capable of handling such a number of eggs simultaneously. Similarly, the apparatus disclosed is set up to handle eggs in groups of 30 during each shelling sequence. However, it should be understood that this invention is equally applicable to the shelling of individual eggs, or groups of eggs in quantities greater than or less than the illustrative quantity of 30 mentioned.

In that same regard, intermediate handling of eggs in hard-cooked egg processing may be eliminated by cooking the eggs directly in the plastic carrying trays in which they are received from the supplier. Such intray cooking is an important adjunct feature of the egg-processing method of this invention. In such case, the cooked eggs, still in their plastic trays, may be moved as noted above to the workman's station 16 for subsequent transfer in sequential groups into the shelling apparatus.

Upon positioning of a group of eggs into the housing 6, the hydraulic head 7 is lowered, the egg shells are punctured, and pressure is applied to the individual eggs to force the egg bodies from their shells. Following each shelling sequence, the head 7 is elevated to clear the housing to permit removal of any egg shells caught in the housing.

In the embodiment illustrated, such shell removal is easily accomplished by pivoting the housing in a clockwise direction about hinge means provided for that purpose to the dotted line position shown in FIG. 1. When in such inverted position, the housing overlies an enlarged opening 26 which extends substantially the full length of table 2. Any egg shells remaining in the receptacle body may fall through the opening into a discharge bin 27 and from the discharge bin into a collection container 28.

To permit such pivotal movement of the housing the same is provided adjacent one of its edges with a pivot shaft 29 which extends transversely thereof, the opposite ends of which are received in bearings 31 secured in any suitable fashion on the upper surface of the table 2. A manually graspable handle 32 is provided adjacent the opposite edge of the housing to permit the workman of the apparatus to pivot the housing as described. In this connection, egg shells lodged in the housing may be loosened therefrom by jarring projections 30 formed on one end of the housing against stops 33 provided on the table 2 above the discharge bin 27 as seen in FIGS. 1 and 2. Also, if required, a source of cleaning water may be provided for use by the workman so that he may spray the housing clean after each sequence of operation if desired.

It should also be understood that any egg shell portions which pass with the shelled egg bodies into the chute 8 and therefrom onto the conveyor 9 may be separated from the egg bodies during an inspection procedure as the egg bodies pass along the conveyor. Removal of the shelled eggs from the conveyor, generally by hand as the same are inspected, will leave only shell fragments on the conveyor which may be discharged from the end thereof into a suitable receptacle provided adjacent such end.

FIG. 4 illustrates means for latching the head 7 in operative engagement with the housing 6 during the shelling operation. While such means may take various forms, in the embodiment illustrated, such means comprise spring urged latch structure, generally designated 36, which comprises a pair of triangular cam-shaped catches 37 formed on opposite sides of the housing 6, as also shown in FIG. 2. Engageable with such catches are a pair of generally hook-shaped latch members 38, pivotally mounted intermediate their ends by pivot bearings 39 secured to the corresponding sides of the head 7. Each of the latch members 38 is urged by compression springs 41 into the latching position shown in FIG. 4 so upon lowering of the head 7 the latch members will be automatically engaged beneath the catches 37.

To permit release of the locking interengagement between latch members 38 and catches 37, a push-pull rod mechanism, generally designated 42, is provided. Such mechanism is actuated by a depressible button 43, positioned for easy access by the apparatus workman. Thus, when button 43 is depressed, the push-pull rod mechanism 42 pivots and retracts the respective latch members 38 to disengage the same from the catches 37 to permit the head 7 to be raised.

Referring to FIGS. 1 and 2, vertical movement of head 7 between its lower operative and upper inoperative positions is effected along guide means designed to insure proper alignment and positioning of the head relative to the housing when the head is lowered. To that end, such guide means comprise a series of generally parallel spaced guide rods 46, 47 and 48 which project upwardly from the table 2 and are secured at their lower ends in any suitable fashion, such as by fittings 49, to the table. It will be noted that only three guide rods are provided to permit introduction and removal of the aforementioned egg transfer mechanism 18 relative to the housing.

It will also be noted from FIG. 1 that means preferably are provided for normally urging the head 7 to its upper position and for maintaining such head in such upper position when not in use. Such means in the embodiment illustrated comprises a pair of elongated coil springs 51 and 52 engaged with brackets 53 and 54 projecting laterally from opposite edges of the head. Such springs are connected at their upper ends to any suitable immovable support (not shown). Thus, head 7 is normally urged toward its upper position by springs 51 and 52 and the workman must draw the head downwardly against the urging of such springs to the latching position described previously.

Figure 6:
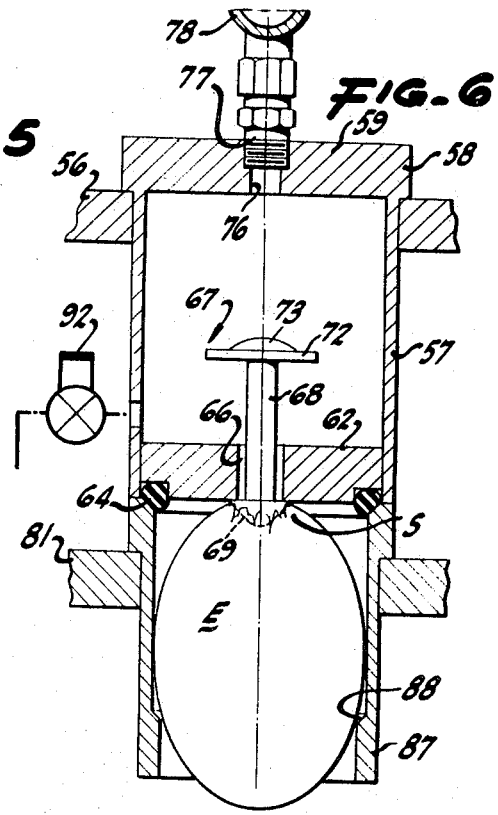
FIG. 6 is a view corresponding generally to FIG. 5 but showing the described components in operative engagement with each other to effect egg shelling.

Referring now to FIGS. 1, 3 and 5, details of the head 7 will be described. Such head, in the embodiment illustrated, comprises an enlarged generally rectangular plate 56 from which depend a plurality of generally cylindrical casings 57, each of which includes an enlarged flange 58 and a closure plate 59 at one end thereof. In the embodiment illustrated, the respective casings 57 are formed separate from the plate 56 and in that event, such plate and casings may be formed of any suitable metal or plastic joined together by welding or strong adhesive. In that connection, as seen in FIG. 6 the plate 56 is formed with a series of spaced openings 61 therethrough to accommodate the respective bodies 57 in the manner shown. The patten of location of the casings is determined by the location of the egg-receiving passageways through housing 6, which in the illustrated embodiment comprises five rows of six casings each, arranged in a regular rectangular pattern.

Casings 57 and the supporting plate 56 may be formed integrally in one piece by molding the same from a rigid plastic or by casting the same from a suitable metal. The closure plate 59 at the upper end of each casing may be secured therein by a suitable adhesive in the case of plastic or by welding or equivalent means in the case of metal.

The lower end of each of the casings 57 is closed by a bottom closure plate 62, similarly adhesively secured or welded in place, depending upon the material from which the casing and plate are formed. In the lower surface of each bottom closure plate, a circular groove 63 is formed and an O-ring fluid seal 64, of rubber or like suitable material, is secured in such groove by a suitable adhesive. Seal 64 projects beyond the surface of the bottom closure plate as seen in FIG. 5.

Each bottom closure plate 62 is provided with a central opening 66 through which extends a closure valve structure, generally designated 67. A cylindrical pin 68 is positioned in the plate opening 66 and at its lower end, pin 68 is provided with an enlarged tapered tip 69 held in place by a screw fastener 71 threadedly engaged with the lower end of the pin. At its upper end pin 68 carries an enlarged flap valve 72 defined by a flat rubber or like washer held in place by means of a large-headed screw fastener 73 passing through the washer into a bore formed in the upper end of the pin. Thus, the pin is held in place for up-and-down movement in opening 66 by the washer 72 at one end and the tip 69 at the other end for the purpose to be described.

The upper closure plate 59 of each casing also is provided with an opening 76 therethrough and a fitting 77 is threadedly or otherwise suitably engaged in such opening. Fitting 77 in turn is connected with a supply pipe 78 which forms a portion of a fluid distribution manifold, generally designated 75 (FIGS. 1 and 3). Each such pipe 78, referring to FIG. 3, has a plurality of fittings 77 depending therefrom in spaced relationship therealong, and each such pipe in turn is connected with a central manifold supply pipe 79 which interconnects the respective pipes 78. The central manifold pipe 79 in turn is connected by a short length of a main feed pipe with a supply hose 80 (FIG. 1) which is connected with a source of fluid under pressure, such as water obtained from a common supply source. It has been found that normal temperature tap water at the standard pressure of approximately 60 p.s.i. produces suitable results with the subject apparatus. It should be understood, however, that other fluids in addition to water are contemplated for use with this invention.

Reference is now directed to FIGS. 1, 2 and 5 for an illustration and description of the preferred embodiment of the egg-receiving housing 6 employed with the subject apparatus. Such housing includes a generally rectangular flat rigid plate 81 from which depend a plurality of circular cylindrical open-ended egg-receiving chambers 82, each of which, in the embodiment illustrated, includes an enlarged flange 83 at its upper end. Such flanges 83 engage the upper surface of plate 81 and prevent passage of the chambers through spaced openings 84 provided in the plate 81 to accommodate the chambers. Chambers 82 are secured in plate openings 84 in any suitable fashion. For example, if the chambers and plate are made of metal, the chambers may be welded in place. Alternatively, if the chambers and plate are made of plastic, the chambers may be secured in place by a suitable adhesive.

As another alternative, the chambers and plate may be formed in one integral piece, such as by molding the same from a suitable rigid plastic or by casting the same from a suitable metal.

Each of the chambers is provided with an internal bore 86 extending therethrough which is of circular cross section and uniform dimension for most of its length. The size of the bore is selected to accommodate therein a hard-cooked egg of a predetermined graded size. Each such egg is inserted into its respective chamber through the open upper end thereof by transfer means as described previously. However, it will be noted that such egg is normally precluded from passing through the open lower end 87 of each chamber by an annular internal circular shoulder 88 of reduced size relative to the major portion of the bore through the chamber. It will be noted that shoulder 88 tapers downwardly and inwardly to provide an inclined ledge on which the egg is supported prior to removal of its shell. While the relative dimensions between the annular shoulder 88 and the remainder of the bore through the body may vary, depending upon and determined by the size of graded eggs to be handled in a particular apparatus, such shoulder preferably is formed with a diameter which is only slightly less than the maximum transverse dimension of the graded eggs to be received within the chamber bore.

It has been found that the structure disclosed herein separates substantially the entire shell of an egg, with substantially the entire tough protective membrane remaining in contact therewith, from the body of the egg. Such separation of an egg body from its shell and membrane is shown in sequence in FIGS. 6 through 9. As the hydraulic head 7 carrying each of the casings 57 thereon is lowered into sealing engagement with the egg-receiving housing, the movable closure valve structure 67 is in the initial position shown in FIG. 5. However, as the tip 69 of the valve structure contacts the upper larger end of an egg E positioned in the egg-receiving chamber 82, pin 68 is moved upwardly by such contact until the upper surface of tip 69 engages the under surface of bottom closure plate 62. At such time, the tip can move no further upwardly and it ruptures or punctures the larger end of the shell, designated S in FIG. 6.

It is well known that the larger end of an egg includes a small air pocket, designated 89 in FIG. 5, at such end and it is to expose such air pocket to the rupturing action of tip 69 that eggs are inserted with their smaller ends positioned downwardly in the respective egg-receiving chambers. With the valve structure 67 in the open position shown in FIG. 6, water under pressure is introduced into the casing 57 and passes around the periphery of pin 68 into engagement with the egg. Water enters the egg shell through the ruptured end thereof and contacts the membrane, designated M, which surrounds the hard-cooked body between the body, designated B, and the shell S.

Figure 7:
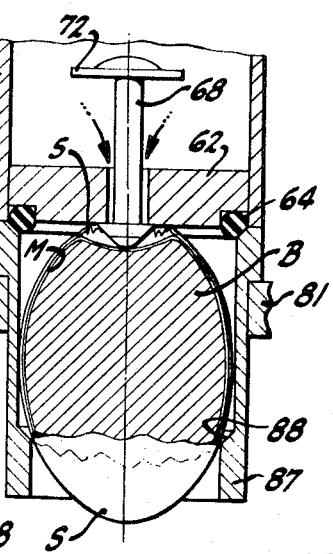
FIGS. 7, 8 and 9 are views corresponding generally to FIG. 6 and illustrating the sequence in which an egg body is separated by fluid pressure from the major portion of its shell and protective membrane.
Figure 9:
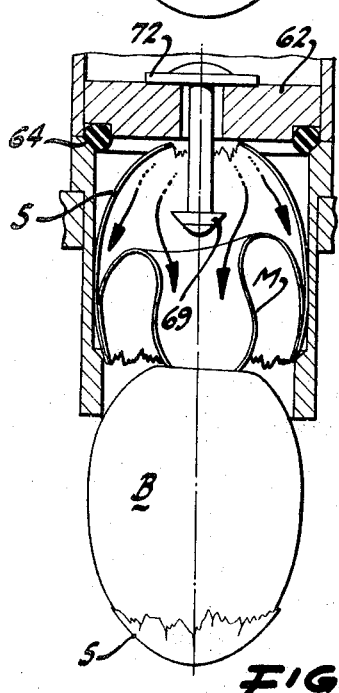
Figure 8:
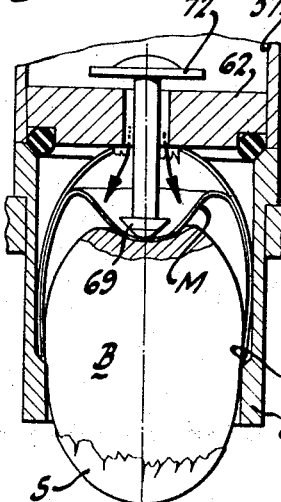

Continued introduction of water into the shell causes the membrane to be drawn back upon itself as seen in sequence in FIGS. 7 through 9. Water pressure behind the membrane forces the egg body B downwardly in the egg-receiving casing. The initial fluid pressure applied to the membrane severs the lower portion of the shell S and the membrane in the location of internal casing shoulder 88 as the egg body is forced downwardly. The small lower portion of the egg shell and attached membrane passes with the egg body from the casing. In that regard, as seen in FIG. 8, the egg body elongates and distorts during its passage through the restricted opening defined by shoulder 88, yet such passage does not result in any egg body damage because of the resilient nature of a hard-cooked egg.

In actual practice, it has been found that the major portion of the egg shell S and the major portion of the membrane M are separated from the egg body in the manner seen in FIG. 9, with the membrane and shell major portion in many cases remaining in the chamber for subsequent removal therefrom in the manner described previously. However, in not infrequent instances, the membrane and major shell portion pass through the reduced shoulder opening in the bottom of the chamber after the egg body has preceded the same therethrough. In either event, the egg body is pushed from the chamber with little or no shell remaining attached thereto.

It has further been found that the small lower portion of the shell S and its attached membrane portion which may remain adhered to the egg body is dislodged when the egg body falls onto the discharge chute 8 mentioned previously. In practice, it has been found that eggs processed as described herein require little if any hand cleaning after they pass from the chambers 82.

It should be further understood that the egg-shelling operation described is substantially an instantaneous one which is rapidly completed when fluid pressure is introduced into the respective chambers.

Upon completion of an egg-shelling operation in a given chamber, the pin 68 of the valve structure 67 is urged by the fluid pressure to its closed lower position seen in FIG. 9, in which position the flap valve 72 seats against the upper surface of the closure plate 62 to preclude any further fluid passage through the opening 66. When all the valve structures in the hydraulic head 7 are seated, introduction of further fluid under pressure into the manifold and therethrough into the head as described is automatically halted, preferably by a standard pressure regulator valve, generally designated 91 in FIG. 1, positioned in the fluid supply line. Such a pressure regulator valve is well known in the art and details of construction thereof are not included herein.

To prepare the hydraulic head for a subsequent cycle of operation, it is necessary to permit the respective valve structures 67 to move upwardly in response to engagement thereof with subsequent eggs. Such movement, however, normally is precluded by water within the respective casings 57. Therefore, pressure relief valve structures preferably are provided in conjunction with the casings. Each such pressure relief valve structure is generally designated 92, and one such structure is shown generally schematically in conjunction with the casing of FIG. 6. However, it should be understood that a similar valve structure is provided in conjunction with each of the casings. The purpose of such valve structure is to relieve fluid pressure within the respective casings 57 so that each valve structure 67 may be moved upwardly from the FIG. 5 position to the FIG. 6 position during initial contact of the respective tips 69 with the egg ends just prior to the shell-piercing operation.

In the absence of such a relief valve, it would not be possible for the valve structure to move upwardly and the tip 69 would be forced downwardly by the immovable pin 68 into the body of the egg, thereby damaging the same.

To effect such pressure release from the respective fluid casings 57, any suitable control may be provided adjacent the workman station for actuating each valve structure 92 in known fashion. In that regard, a control panel (FIG. 1) designated 93 is provided on the machine framework and includes a depressible control button 94 actuatable by the workman with his hand, or a portion of his leg if more convenient. Such control button 94 is connected, through a suitable and known solenoid mechanism of conventional construction with the respective pressure release valves 92 in the manner well known in the valve control art. Upon a signal being transmitted to the respective valves, the valves are opened to permit fluid within the respective casings to flow therefrom through the valves and running onto the surface of the underlying plate 81. Following such pressure release, the head 7 is then raised to permit a subsequent group of eggs to be introduced into the housing 7 as described previously.

Because solenoid controllable fluid pressure relief valves are known in the control art, details of such a valve have not been shown herein.

An alternative construction for the hydraulic head 7 also is contemplated within the scope of this invention. Such a head may be formed with only one enlarged fluid casing, rather than with a plurality of separate casings 57 as shown in the drawings. In such an instance, the enlarged casing would overlie all of the egg-receiving chambers 82 in housing 6 and would apply water pressure into all such chambers simultaneously. Such construction would be somewhat simpler to construct and would require only one pressure relief valve in conjunction therewith, rather than the plurality of such valves employed in the illustrated construction.

Having thus made a full disclosure of the preferred embodiment of this invention, which is intended to be exemplary rather than restrictive, reference is directed to the appended claims for the scope of protection to be afforded thereto.

We claim:
1. Egg shelling apparatus for cooked eggs comprising
   A. a housing having a chamber therein for receiving an egg, the shell of which is generally intact, said chamber having
      1. a bore extending therethrough of predetermined dimension of sufficient size to accommodate an egg therein, and
      2. an internal shoulder adjacent one end of said bore of reduced size relative to said predetermined dimension,
      3. said shoulder normally precluding passage of such egg therethrough,
   B. a fluid head having a casing thereon which is engageable with said housing over said chamber,
   C. structure in conjunction with said casing for puncturing an end of the shell of such egg positioned in said bore as said casing is engaged with said housing, and
   D. a fluid source for introducing fluid under pressure into said casing against such egg in said chamber after a puncture has been formed in the upper end of the shell of such egg to force the body of such egg from the shell thereof and to carry such separated egg body from said chamber past said shoulder.
2. In combination,
   A. a housing having a plurality of generally parallel passageways extending therethrough,
      1. each said passageway being of a predetermined size sufficient to receive an egg through one end thereof the shell of which is generally intact,
      2. the other end of each said passageway having an internal shoulder of reduced dimension adjacent thereto which normally precludes passage of an egg therethrough,
   B. means for transferring simultaneously a plurality of eggs from a source of supply thereof into said passageways,

C. a fluid head movable to overlie and engage said housing in fluidtight relationship therewith when said eggs are positioned in said passageways, D. structure in conjunction with said fluid head for puncturing ends of the shells of said eggs in said passageways, and E. means for introducing fluid into said head and therethrough into contact with said eggs in said passageways after an end of each said egg has been punctured so that said fluid may enter between the body of each said egg and the shell thereof to force each said egg body past the shoulder of its associated passageway to separate such body from such shell.

3. The apparatus of claim 1 in which said housing further includes 4. a plurality of said chambers having bores extending therethrough each of which includes one of said internal shoulders adjacent an end thereof, and in which said fluid head includes 1. a plurality of said casings which are engageable with the respective chambers of said housing, whereby said apparatus is adapted to separate simultaneously the shells from the bodies of a plurality of eggs.

4. The apparatus of claim 1 in which said fluid source introduces a liquid, such as water, into and through said housing.

5. A method of separating intact the body of a hard-cooked egg from the shell thereof, comprising A. providing a passageway having one end thereof which is restricted to preclude normal passage of said egg therepast, B. positioning said egg with its shell generally intact in said passageway with one end thereof engaged with said passageway restriction so that such restriction normally precludes passage of said egg therethrough, C. puncturing the other end of the shell of said egg without otherwise appreciably disrupting the continuity of said shell while said egg is positioned in said passageway, and applying a fluid under pressure against said egg at said ruptured end of said shell in said passageway so that said fluid enters said shell and forces said egg body therefrom and carries said thus separated egg body through said passageway past said restriction of said passageway without any major portion of said shell attached thereto.

6. The method of claim 5 in which said fluid introduced into said passageway is a liquid, such as water.

7. A method of separating intact the body of a hard-cooked egg from the shell thereof, comprising A. providing a housing having a passageway therethrough one end of which is restricted to preclude normal passage of said egg therefrom, B. introducing an egg with its shell generally intact into said passageway, C. puncturing the upper end of said egg while said egg is positioned in said passageway while retaining the remainder of said shell substantially intact, D. introducing fluid under pressure into said passageway against said one end of said egg, and E. forcing said fluid between said shell and said egg body to force said body downwardly to sever a lower minor portion of said shell from the remaining major portion thereof and to carry said egg body past the restriction in said passageway without said major shell portion attached thereto.

8. The method of claim 7 in which said fluid introduced into said passageway is a liquid, such as water.

9. The method of claim 7 in which said egg is placed in said passageway with its smaller end facing downwardly so that its larger end is punctured to expose the air pocket normally found at such larger end within said shell.

10. The method of claim 7 in which

F. said housing provided includes a plurality of said restricted passageways therethrough, and in which G. a plurality of eggs are positioned in said passageways, and in which H. fluid is introduced simultaneously against all such eggs after the ends of their shells have been punctured to separate simultaneously the bodies of all such eggs from the shells thereof.

11. The combination of claim 2 in which said structure in conjunction with said fluid head includes 1. a plurality of pins normally depending therefrom which are engageable with the respective eggs in said passageways, 2. said pins puncturing the shells of said eggs automatically as said head is positioned in engagement with said housing.

12. The combination of claim 11 in which each of said pins includes

A. a seal on the upper end thereof which closes off fluid flow into an associated passageway in response to movement of an egg body from such passageway.

13. Egg-shelling apparatus for cooked eggs comprising

A. a housing having a passageway therethrough of predetermined dimension of sufficient size to accommodate an egg therein, 1. an internal shoulder adjacent one end of said passageway of reduced size relative to said predetermined dimension, B. a fluid head comprising a casing engageable with said housing over said passageway, 1. a closure plate at the upper end of said casing having a fitting extending therethrough, 2. a closure plate at the bottom end of said casing having an opening therethrough, C. valve structure extending through the opening in said bottom closure plate of said casing comprising, 1. a pin movably received in said closure plate opening, 2. a seal on the upper end of said pin within said housing to close said opening when said pin is in its lower position, and 3. an enlarged tip on the lower end of said pin to puncture an end of the shell of an egg in said passageway when said pin is in its upper position, and D. a fluid source for introducing fluid under pressure into and through said fitting against an egg in said passageway after said shell has been punctured by said pin tip to separate the body of such egg from the shell thereof and to carry such separated egg body from said passageway past said shoulder.

14. The apparatus of claim 13 which further includes

E. relief valve structure in conjunction with said casing to relieve fluid pressure built up therein after said egg body has been forced from said passageway to permit said valve structure pin to move from its said lower position toward its said upper position.

15. The apparatus of claim 13 in which said housing further includes 3. a plurality of said passageways extending therethrough each of which includes one said internal shoulder adjacent an end thereof, and in which said fluid head further includes 1. a plurality of said casings and associated valve structures which are positionable in engagement over the respective passageways of said housing, whereby said apparatus is adapted to separate simultaneously the shells from the bodies of a plurality of eggs.